(12) United States Patent
Van Meveren et al.

(10) Patent No.: US 9,425,671 B1
(45) Date of Patent: Aug. 23, 2016

(54) LOW-SPEED TOWED POWER GENERATING APPARATUS

(71) Applicants: Arie Allen Van Meveren, Colman, SD (US); Gregory Dale Van Meveren, Colman, SD (US)

(72) Inventors: Arie Allen Van Meveren, Colman, SD (US); Gregory Dale Van Meveren, Colman, SD (US)

( * ) Notice: Subject to any disclaimer, the term of this patent is extended or adjusted under 35 U.S.C. 154(b) by 0 days.

(21) Appl. No.: 14/321,224

(22) Filed: Jul. 1, 2014

(51) Int. Cl.
| F02B 63/04 | (2006.01) |
| H02K 7/18 | (2006.01) |
| B62D 63/06 | (2006.01) |
| B60K 17/16 | (2006.01) |
| B60K 1/04 | (2006.01) |

(52) U.S. Cl.
CPC ............ H02K 7/1861 (2013.01); B60K 17/165 (2013.01); B62D 63/064 (2013.01); B60K 1/04 (2013.01)

(58) Field of Classification Search
USPC .................................................... 290/1 A, 50
See application file for complete search history.

(56) References Cited

U.S. PATENT DOCUMENTS

| 2,159,885 | A | | 5/1939 | Cullin |
| 5,559,420 | A | | 9/1996 | Kohchi |
| 5,921,334 | A | | 7/1999 | Al-Dokhi |
| 6,876,096 | B2 | * | 4/2005 | Du Plessis et al. ............ 290/4 C |
| 7,514,803 | B2 | * | 4/2009 | Wilks ............................ 290/1 A |
| 8,215,436 | B2 | | 7/2012 | Degrave |
| 8,469,123 | B1 | | 6/2013 | Knickerbocker |
| 2004/0012205 | A1 | * | 1/2004 | Sua-An ....................... 290/40 C |
| 2007/0051542 | A1 | | 3/2007 | Wilks |
| 2007/0193795 | A1 | | 8/2007 | Forsyth |
| 2008/0023234 | A1 | | 1/2008 | Wang |
| 2009/0315338 | A1 | * | 12/2009 | Ylvisaker ..................... 290/1 R |
| 2010/0065344 | A1 | | 3/2010 | Collings, III |
| 2011/0320074 | A1 | * | 12/2011 | Erlston et al. ................... 701/22 |
| 2013/0119665 | A1 | * | 5/2013 | Berbari .......................... 290/50 |

* cited by examiner

*Primary Examiner* — Tho D Ta
(74) *Attorney, Agent, or Firm* — Jeffrey A. Proehl; Woods, Fuller, Shultz & Smith P.C.

(57) ABSTRACT

A low-speed towed power generating apparatus may include a mobile base comprising a platform and an axle with a pair of wheels and a differential gear set and a pair of axle shafts extending from the differential gear set and having a said wheel mounted on each of the axle shafts such that rotation of the wheels rotates the shafts and the differential gear set. The axle may include an output pulley mounted on the differential gear set. A generator assembly on the mobile base may comprise an electrical generator having an input shaft with an input pulley mounted on the input shaft, a drive belt being mounted on the input pulley and the output pulley, and a power output circuit electrically connected to the generator. A battery may be electrically connected to the generator for receiving power from the power output circuit of the generator assembly.

6 Claims, 3 Drawing Sheets

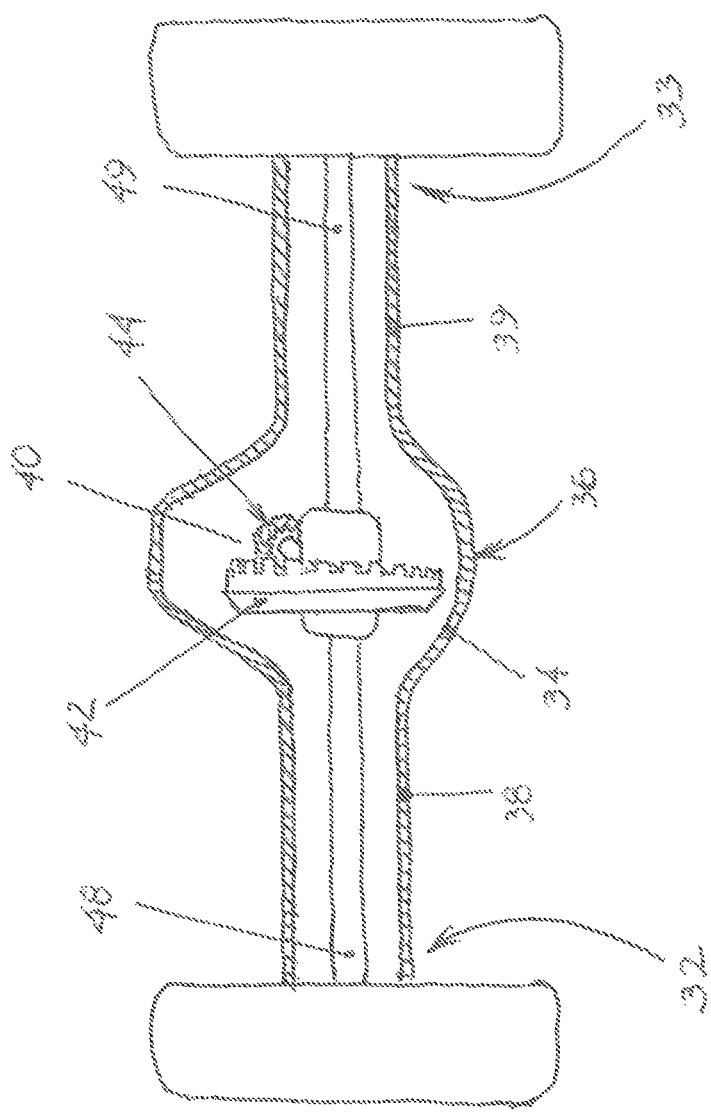

LOW-SPEED TOWED POWER GENERATING APPARATUS

BACKGROUND

Field

The present disclosure relates to electrical generation equipment and more particularly pertains to a new low-speed towed power generating apparatus for recovering energy from the movement of relatively smaller vehicles.

SUMMARY

The present disclosure relates to a low-speed towed power generating apparatus which may include a mobile base comprising a platform and an axle with a pair of wheels being mounted on the axle. The axle may include a differential gear set and a pair of axle shafts extending from the differential gear set to lateral ends of the axle. The axle may have a wheel mounted on each of the axle shafts such that rotation of the wheels rotates the shafts and the differential gear set. The axle may include an output pulley mounted on the differential gear set to be rotated by the differential gear set. The apparatus may further include a generator assembly mounted on the mobile base. The generator assembly may comprise an electrical generator having an input shaft, and an input pulley may be mounted on the input shaft. A drive belt may be mounted on the input pulley and the output pulley and a power output circuit may be electrically connected to the generator. A battery may be electrically connected to the generator for receiving power from the power output circuit of the generator assembly. The differential gear set, the output pulley and the input pulley may be configured to rotate the generator input shaft at a speed suitable to charge the battery when the mobile base is towed at a speed of less than approximately 15 miles per hour.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3 is a schematic rear view of the axle of the apparatus.

DETAILED DESCRIPTION

Figure 1:
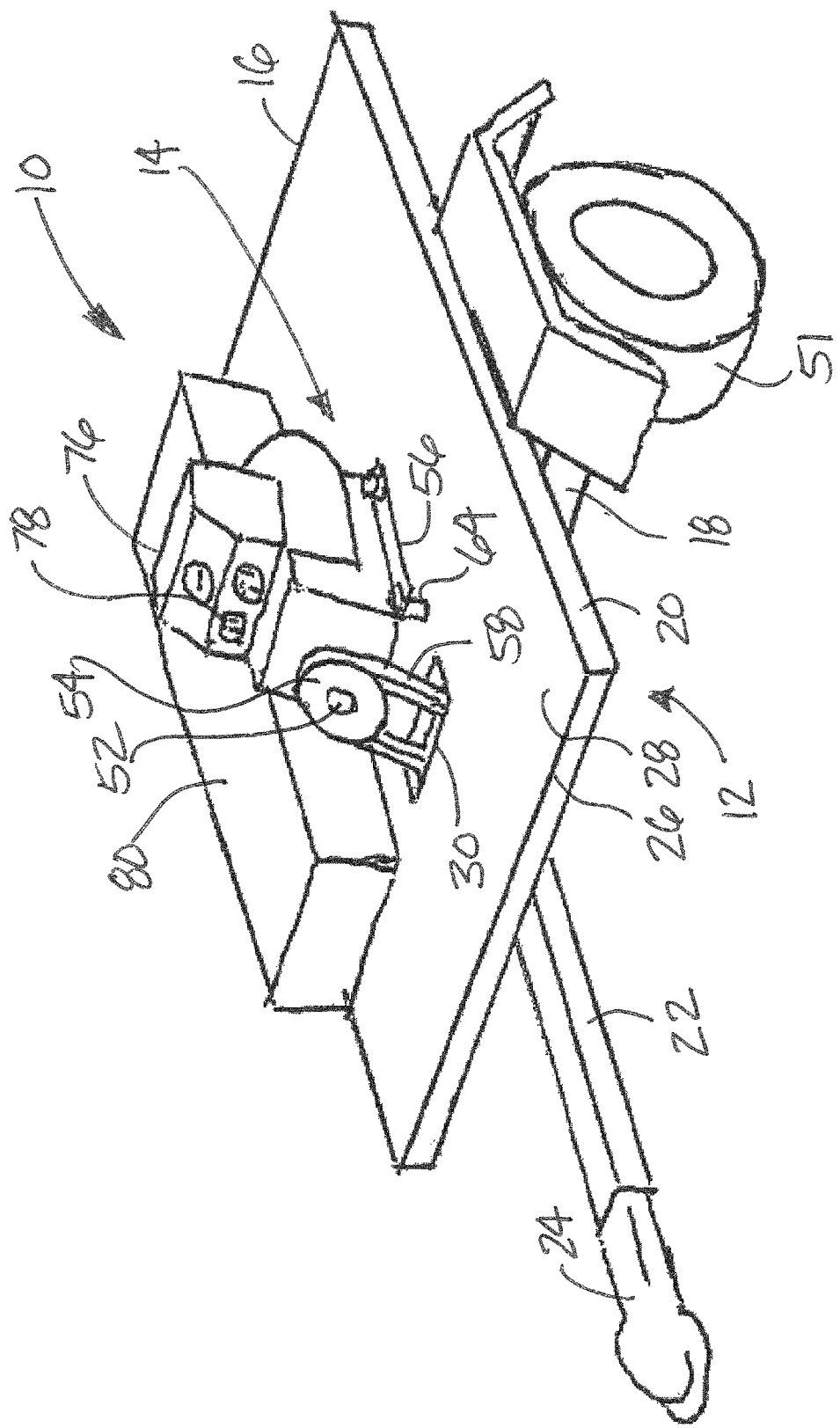
FIG. 1 is a schematic perspective view of a new low-speed towed power generating apparatus according to the present disclosure.
Figure 2:
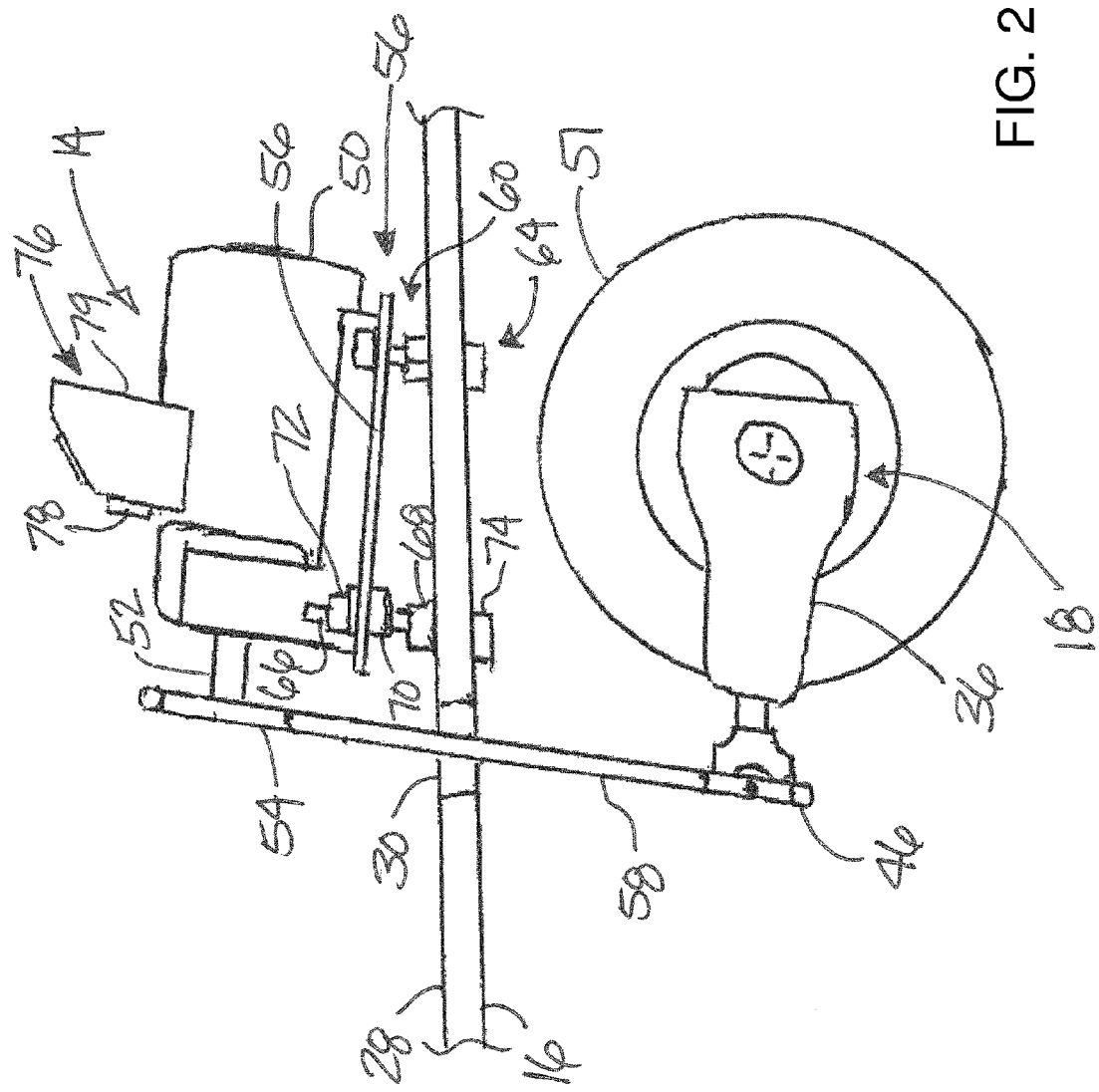
FIG. 2 is a schematic side view of the power generating apparatus, according to an illustrative embodiment.

With reference now to the drawings, and in particular to FIGS. 1 through 3 thereof, a new low-speed towed power generating apparatus embodying the principles and concepts of the disclosed subject matter will be described.

The applicants have recognized there is an opportunity to recover energy from relatively low speed travel such as the travel by small "lawn" tractors, all terrain vehicles (ATVs), and similar vehicles.

In fact, the invention is highly effective for generating power at speeds as low as 4 mph, which approximates the speed of a riding lawnmower moving across a lawn surface, as well as low speed operation of an all-terrain vehicle (ATV) or even the speed of a draft animal such as a horse. The invention may include power outlets at the desired voltages for direct power usage, as well as the previously noted battery for energy storage.

Aspects of the disclosure involve a low-speed towed power generating apparatus 10 which may generally include a mobile base 12 and a generator assembly 14 mounted on the mobile base. The mobile base 12 may comprise a trailer that is towable behind another vehicle, such as the aforementioned vehicles, and especially those vehicles that are not capable or designed of high speed travel.

The mobile base 12, in greater detail, may include a platform 16 and an axle 18 mounted on the platform. The platform 16 may include a frame 20 which may further include a tongue member 22 that extends forwardly from the platform. A hitch 24 may be mounted on a front end of the tongue member for attaching to a towing vehicle. The platform may also include a deck 26 which is positioned on and supported by the frame 20 and may have an upper surface 28. A belt opening 30 may be formed in the deck 26 for extending through the platform.

The axle 18 of the mobile base 12 may be elongated with a first lateral end 32 and a second lateral end 33. The axle 18 may include an axle housing 34 which may be mounted on the platform 16. The axle housing may be mounted on the frame 20 of the platform, and may include a differential housing portion 36 and a pair of lateral tube portions 38, 39, each of the lateral tube portions extending from the differential housing to one of the lateral ends 32, 33 of the axle housing.

The axle 18 may also include a differential gear set 40 located in the differential housing portion 36. The differential gear set may include a ring gear 42 and a pinion gear 44, and teeth on the pinion gear may engage teeth on the ring gear. The axle 18 may include an output pulley 46 mounted on the differential gear set to be rotated by the differential gear set 40, and the output pulley may be mounted on the pinion gear 44. The axle 18 may include at least one axle shaft 48, and may comprise a pair of axle shafts 48, 49. The axle shafts may be rotatable with respect to the axle housing 34 and may be connected to the ring gear. The axle shafts may each extend from one of the lateral ends 32, 33 of the axle toward the differential housing portion, and each shaft may connect to the differential gear set. The axle 18 may also include a suspension assembly mounting the axle housing to the platform, and may include a spring element connected to the axle housing and to the frame of the platform.

The axle may also include a pair of wheels 51, with at least one (and preferably both) of the wheels being mounted on an axle shaft.

The generator assembly 14 of the apparatus 10 may include an electrical generator 50 configured to generate electrical power upon the input of rotational motion. The generator 50 may have an input shaft 52 and an input pulley 54 mounted on the input shaft. The generator 50 may be positioned above the platform, although this is not critical. The generator 50 may have a base 56.

The generator assembly 14 may also include a drive belt 58 mounted on the input pulley 54 and the output pulley 46 for transferring rotation therebetween. The drive belt 58 may pass through the belt opening 30 in the platform when the pulleys are located on opposite sides of the platform.

A support frame 60 of the generator assembly may be provided to mount the generator 50 on the platform 16. The support frame 60 may extend upwardly from the platform, and may include adjustment means 62 for adjusting a distance between the input pulley 54 (as well as the generator) and the platform to adjust a tension in the drive belt 58. The adjustment means 62 may comprise a plurality of legs 64. One or more of the legs may have an adjustable effective length to achieve the adjustment. Each of the legs that is adjustable may include a threaded shaft 66, at least one lower nut 68 threaded onto the threaded shaft and positioned above the platform to bear upon the platform, and at least one upper nut 70 threaded onto the threaded shaft and positioned below the base 56 to support the base. Further, at least one upper retaining nut 72 may be threaded on the threaded shaft 66 above the base 56 of the generator to retain the base on the threaded shaft, and at least one lower retaining nut 74 may be threaded on to the threaded shaft below the platform to retain the shaft on the platform.

The generator assembly may further include a power output circuit 76 that is electrically connected to the generator 50, and may have a power outlet 78. The power outlet may be configured to output approximately 110 volt alternating current electrical power to a device connected to the outlet, and may also output approximately 220 volt alternating current electrical power. The power output circuit 76 may also include an inverter 79 configured to convert alternating current power from the electrical generator to direct current electrical power.

The apparatus 10 may also include a battery 80 that is electrically connected to the generator 50 for receiving power from the generator, and may be connected to the inverter 79 of the power output circuit to receive DC power. The battery 80 may be carried on the mobile base 12 along with the generator assembly, and may be positioned on the platform. The battery 80 may have a suitable output connector or connectors for outputting the power stored in the battery, and may also be removable from the mobile base to allow the battery to be moved to a different location for use after charging.

Significantly, the differential gear set 40, the output pulley 46 and the input pulley 54 may be configured to rotate the generator input shaft 52 at a suitable rotational speed for producing rated power when the mobile base is towed at a speed of less than approximately 15 miles per hour. One typical range of speed of operation or movement of the apparatus 10 may be approximately 4 miles per hour to approximately 12 miles per hour, and in some highly advantageous applications, the speed may be around about approximately 4 miles per hour.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A low-speed towed power generating apparatus comprising:
   a mobile base comprising a platform and an axle with a pair of wheels being mounted on the axle, the axle including a differential gear set and a pair of axle shafts extending from the differential gear set and having a said wheel mounted on each of the axle shafts such that rotation of the wheels rotates the shafts and the differential gear set, the axle including an output pulley mounted on the differential gear set to be rotated by the differential gear set;
   a generator assembly mounted on the mobile base, the generator assembly comprising
      an electrical generator, the generator having an input shaft, an input pulley being mounted on the input shaft;
      a drive belt being mounted on the input pulley and the output pulley;
      a power output circuit electrically connected to the generator; and
   a battery electrically connected to the generator for receiving power from the power output circuit of the generator assembly;
   wherein the differential gear set, the output pulley and the input pulley are configured to rotate the generator input shaft at a speed suitable to charge the battery when the mobile base is towed at a speed of less than approximately 15 miles per hour;
   wherein the generator has a base and is positioned above the platform, a support frame mounting the generator on the platform and extending upwardly from the platform;

wherein the support frame includes an adjustment structure configured to adjusting a distance between the input pulley on the generator and the platform to adjust a tension in the drive belt;

wherein the adjustment structure comprises a plurality of legs, at least one of the legs having an adjustable effective length, each of the adjustable legs including a threaded shaft, at least one lower nut threaded onto the threaded shaft and positioned above the platform to bear upon the platform, and at least one upper nut threaded onto the threaded shaft and positioned below the base of the generator to support the base.

2. The apparatus of claim 1 wherein the adjustment structure comprises at least one upper retaining nut being threaded on the threaded shaft above the base of the generator to retain the base on the threaded shaft, and at least one lower retaining nut being threaded on the threaded shaft below the platform to retain the shaft on the platform.

3. The apparatus of claim 1 wherein the power output circuit includes an inverter configured to convert alternating current power from the electrical generator to direct current electrical power.

4. The apparatus of claim 1 wherein the output pulley is mounted on a pinion gear shaft of the differential gear set.

5. The apparatus of claim 1 wherein the platform includes a frame with a tongue member extending forwardly from the platform and a hitch mounted on a front end of the tongue member; and a deck positioned on the frame and having an upper surface, a belt opening being formed in the deck with the belt extending through the belt opening between the input and output pulleys.

6. The apparatus of claim 1 wherein the power output circuit has at least one power outlet for removably receiving a power plug to receive electrical power;

wherein the at least one power outlet includes a power outlet configured to output approximately 110 volt alternating current electrical power to a connected device; and wherein the at least one power outlet includes a power outlet configured to output approximately 220 volt alternating current electrical power to a connected device.

\* \* \* \* \*